United States Patent
Kang

(10) Patent No.: US 9,013,661 B2
(45) Date of Patent: Apr. 21, 2015

(54) LIQUID CRYSTAL DISPLAY PANEL AND DISPLAY APPARATUS USING THE SAME

(75) Inventor: Chihtsung Kang, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 13/522,961

(22) PCT Filed: May 25, 2012

(86) PCT No.: PCT/CN2012/076072
§ 371 (c)(1),
(2), (4) Date: Jul. 19, 2012

(87) PCT Pub. No.: WO2013/174011
PCT Pub. Date: Nov. 28, 2013

(65) Prior Publication Data
US 2015/0070632 A1 Mar. 12, 2015

(30) Foreign Application Priority Data
May 24, 2012 (CN) .......................... 2012 1 0163512

(51) Int. Cl.
G02F 1/1343 (2006.01)
G02F 1/13363 (2006.01)
G02F 1/1335 (2006.01)

(52) U.S. Cl.
CPC ...... *G02F 1/13363* (2013.01); *G02F 1/134309* (2013.01); *G02F 1/133528* (2013.01); *G02F 1/1336* (2013.01); *G02F 2001/133638* (2013.01)

(58) Field of Classification Search
CPC ................. G02F 2001/133635; G02F 2413/09
USPC ........................................ 349/129–130, 141
See application file for complete search history.

(56) References Cited

U.S. PATENT DOCUMENTS 7,982,834 B2 * 7/2011 Sakamoto et al. ............ 349/114
2011/0310335 A1 * 12/2011 Hashimoto et al. ............ 349/96

* cited by examiner

*Primary Examiner* — James Dudek
(74) *Attorney, Agent, or Firm* — Mark M. Friedman

(57) ABSTRACT

The present invention provides a liquid crystal display (LCD) panel and a display apparatus using the same. The LCD panel comprises a first substrate, a second substrate, a liquid crystal layer and quarter wave ($\lambda/4$) pattern retarder films. The liquid crystal layer is formed between the first substrate and the second substrate. The second substrate comprises a second electrode, wherein the second electrode comprises main pixel regions and sub-pixel regions. The $\lambda/4$ pattern retarder films are disposed between the first substrate and a first polarizer, and between the second substrate and a second polarizer, respectively. The present invention can improve the color shift problem and the transmittance of the LCD panel.

19 Claims, 7 Drawing Sheets

LIQUID CRYSTAL DISPLAY PANEL AND DISPLAY APPARATUS USING THE SAME

FIELD OF THE INVENTION

The present invention relates to a field of a liquid crystal display technology, and more particularly to a liquid crystal display (LCD) panel and a display apparatus using the same.

BACKGROUND OF THE INVENTION

Liquid crystal displays (LCDs) have been widely applied in electrical products. Currently, most of LCDs are backlight type LCDs which comprise a liquid crystal panel and a backlight module. The liquid crystal panel is composed of two transparent substrates and a liquid crystal sealed there-between.

At present, a vertical alignment (VA) technology has been developed for LCD panels. For example, a polymer stabilized vertical alignment (PSVA) type liquid crystal display panel which is made using a polymer-stabilized alignment (PSA) process, can have some advantages, such as wide viewing angle, high aperture ratio, high contrast and simple process.

In the PSVA type LCD, reactive monomers can be doped in the liquid crystal between the two transparent substrates and mixed with liquid crystal molecules, wherein the a polyimide (PI) is coated on the surface of each of the transparent substrates to be an alignment layer. Subsequently, when applying a voltage and irradiating an ultraviolet (UV) light to the two transparent substrates, a phase separation arises in the reactive monomers and the liquid crystal molecules, and a polymer is formed on the alignment layer of the transparent substrate. The liquid crystal molecules are oriented along a direction of the polymer due to the interaction between the polymer and the liquid crystal molecules. Therefore, the liquid crystal molecules between the transparent substrates can have a pre-tilt angle.

However, currently, a color shift problem is likely to occur in the VA type LCD, hence deteriorating the display quality of the LCD. For improving the above-mentioned color shift problem, a pixel structure of the LCD panel may be varied, but the variation of the pixel structure may result in a reduction of a transmittance of the LCD panel.

As a result, it is necessary to provide an LCD panel and a display apparatus using the same to solve the problems existing in the conventional technologies, as described above.

SUMMARY OF THE INVENTION

The present invention provides an LCD panel and a display apparatus using the same to solve the color shift problem and the transmittance problem of the VA type LCD.

A primary object of the present invention is to provide a liquid crystal display panel, and the liquid crystal display panel comprises: a first substrate comprising a first electrode; a second substrate comprising a second electrode, wherein the second electrode has a plurality of main pixel regions and a plurality of sub-pixel regions, and each of the main pixel regions comprises a first trunk portion and plurality of first branch portions, and an angle between the first trunk portion and the first branch portions is equal to 45 degrees, and each of the sub-pixel regions comprises a second trunk portion and plurality of second branch portions, and an angle between the second trunk portion and the second branch portions is less than or greater than 45 degrees; a liquid crystal layer formed between the first substrate and the second substrate; a first polarizer disposed at an outer side of the first substrate; a second polarizer disposed at an outer side of the second substrate; and two quarter wave pattern retarder films disposed between the first substrate and the first polarizer, and between the second substrate and the second polarizer, respectively, wherein the quarter wave pattern retarder films comprise a plurality of quarter wave retarder rows and a plurality of zero wave retarder rows, and the zero wave retarder rows are positioned to the main pixel regions, and the quarter wave retarder rows are positioned to the sub-pixel regions.

Another object of the present invention is to provide a liquid crystal display panel, and the liquid crystal display panel comprises: a first substrate comprising a first electrode; a second substrate comprising a second electrode, wherein the second electrode has a plurality of main pixel regions and a plurality of sub-pixel regions, and each of the main pixel regions comprises a first trunk portion and plurality of first branch portions, and an angle between the first trunk portion and the first branch portions is equal to 45 degrees, and each of the sub-pixel regions comprises a second trunk portion and plurality of second branch portions, and an angle between the second trunk portion and the second branch portions is in the range of 10 degrees to 80 degrees except 45 degrees; a liquid crystal layer formed between the first substrate and the second substrate; a first polarizer disposed at an outer side of the first substrate; a second polarizer disposed at an outer side of the second substrate; and two quarter wave pattern retarder films disposed between the first substrate and the first polarizer, and between the second substrate and the second polarizer, respectively, wherein the quarter wave pattern retarder films comprise a plurality of quarter wave retarder rows and a plurality of zero wave retarder rows, and the zero wave retarder rows are positioned to the main pixel regions, and the quarter wave retarder rows are positioned to the sub-pixel regions, and an angle between the absorption axes of the first polarizer and the second polarizer is 90 degrees, and an angle between a slow axis of the quarter wave retarder rows and an absorption axis of the first polarizer or the second polarizer is 45 degrees.

A further object of the present invention is to provide a display apparatus comprising a backlight module and a liquid crystal display panel. The liquid crystal display panel comprises: a first substrate comprising a first electrode; a second substrate comprising a second electrode, wherein the second electrode has a plurality of main pixel regions and a plurality of sub-pixel regions, and each of the main pixel regions comprises a first trunk portion and plurality of first branch portions, and an angle between the first trunk portion and the first branch portions is equal to 45 degrees, and each of the sub-pixel regions comprises a second trunk portion and plurality of second branch portions, and an angle between the second trunk portion and the second branch portions is less than or greater than 45 degrees; a liquid crystal layer formed between the first substrate and the second substrate; a first polarizer disposed at an outer side of the first substrate; a second polarizer disposed at an outer side of the second substrate; and two quarter wave pattern retarder films disposed between the first substrate and the first polarizer, and between the second substrate and the second polarizer, respectively, wherein the quarter wave pattern retarder films comprise a plurality of quarter wave retarder rows and a plurality of zero wave retarder rows, and the zero wave retarder rows are positioned to the main pixel regions, and the quarter wave retarder rows are positioned to the sub-pixel regions.

In one embodiment of the present invention, the angle between the second trunk portion and the second branch portions is in the range of 10 degrees to 80 degrees except 45 degrees.

In one embodiment of the present invention, the angle between the second trunk portion and the second branch portions is in the range of 35 degrees to 55 degrees except 45 degrees.

In one embodiment of the present invention, a width of the zero wave retarder rows is the same to a width of the main pixel regions, and a width of the quarter wave retarder rows is the same to a width of the sub-pixel regions.

In one embodiment of the present invention, an angle between the absorption axes of the first polarizer and the second polarizer is 90 degrees, and an angle between a slow axis of the quarter wave retarder rows and an absorption axis of the first polarizer or the second polarizer is 45 degrees.

In one embodiment of the present invention, angles between the second trunk portion and the second branch portions in the sub-pixel regions are different to each other.

In one embodiment of the present invention, an area of the main pixel region is larger than an area of the sub-pixel region.

In the LCD panel and the display apparatus using the same of the present invention, with the use of the pixel electrode structure, the color shift problem of the VA type LCD apparatus can be improved. Moreover, the polarized direction and angles of the light rays can be adjusted by the λ/4 pattern retarder films for enhancing the transmittance of the liquid crystal display panel.

The structure and the technical means adopted by the present invention to achieve the above and other objects can be best understood by referring to the following detailed description of the preferred embodiments and the accompanying drawings.

DETAILED DESCRIPTION OF THE PREFERRED EMBODIMENTS

Figure 1:
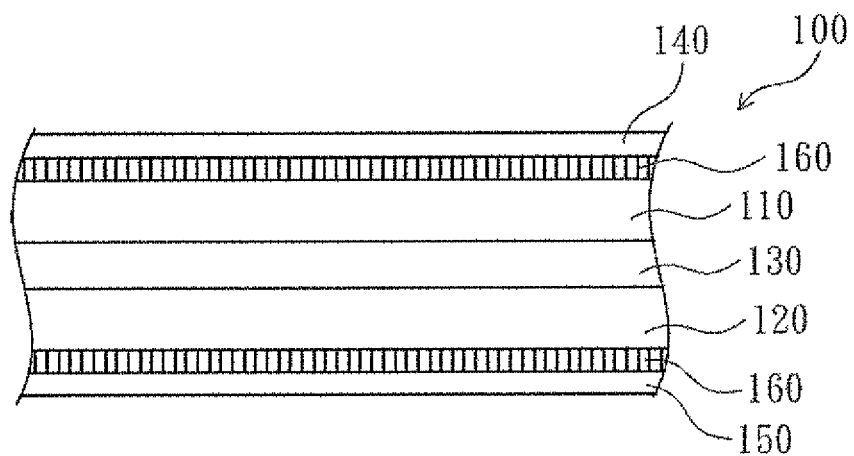
FIG. 1 is a cross-sectional view showing a liquid crystal display panel according to one embodiment of the present invention.

The following embodiments are referring to the accompanying drawings for exemplifying specific implementable embodiments of the present invention. Furthermore, directional terms described by the present invention, such as upper, lower, front, back, left, right, inner, outer, side and etc., are only directions by referring to the accompanying drawings, and thus the used directional terms are used to describe and understand the present invention, but the present invention is not limited thereto.

In the drawings, structure-like elements are labeled with like reference numerals.

Referring to FIG. 1, a cross-sectional view showing a liquid crystal display (LCD) panel according to one embodiment of the present invention is illustrated. The display apparatus of the present embodiment can comprises the liquid crystal display panel 100 and a backlight module (not shown). The liquid crystal display panel 100 is disposed opposite to the backlight module, and the backlight module may be realized as a side lighting backlight module or a bottom lighting backlight module to provide the liquid crystal display panel 100 with the back-light. The liquid crystal display panel 100 may be a VA type liquid crystal display panel, such as a PSVA type liquid crystal display panel or a pattern vertical alignment (PVA) type liquid crystal display panel.

Referring to FIG. 1 again, the liquid crystal display panel 100 may comprise a first substrate 110, a second substrate 120, a liquid crystal layer 130, a first polarizer 140 and a second polarizer 150 and two quarter wave (λ/4) pattern retarder films 160. The liquid crystal layer 130 is formed between the first substrate 110 and the second substrate 120. That is, the liquid crystal layer 130 is positioned at inner sides of the first substrate 110 and the second substrate 120. The first polarizer 140 is disposed at an outer side of the first substrate 110, and the second polarizer 150 is disposed at an outer side of the second substrate 120. The λ/4 pattern retarder film 160 is disposed between the first substrate 110 and the first polarizer 140, and between the second substrate 120 and the second polarizer 150, respectively.

Referring to FIG. 1, the first substrate 110 and the second substrate 120 may be realized as glass substrates or flexible plastic substrates. The first substrate 110 may be a glass substrate or other material substrate with color filters (CF), and the second substrate 120 may be a glass substrate or other material substrate with a thin film transistor (TFT) array. It notes that the CF and the TFT array may also be disposed on the same substrate in other embodiments.

Figure 2:
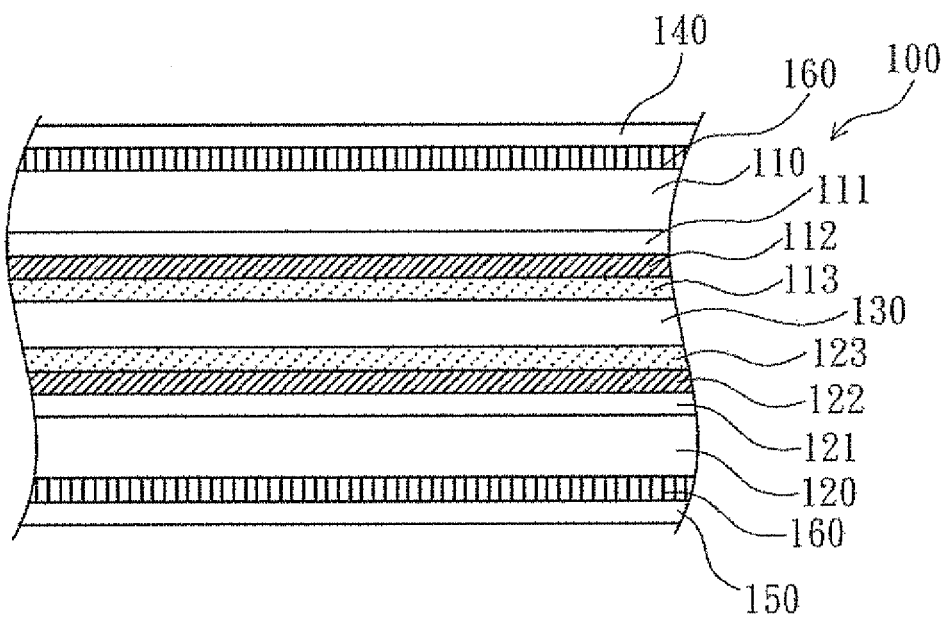
FIG. 2 is a cross-sectional view showing a PSVA type liquid crystal display panel according to one embodiment of the present invention.

Referring to FIG. 2, a cross-sectional view showing a PSVA type liquid crystal display panel according to one embodiment of the present invention is illustrated. In this embodiment, the liquid crystal display panel 100 may be, for example, a PSVA type liquid crystal display panel. At this time, the liquid crystal layer 130 can include reactive monomers and liquid crystal molecules. The reactive monomers are preferably photo-sensitive monomers mixed with the liquid crystal molecules. The first polarizer 140 is disposed on one side of the first substrate 110 and opposite to the liquid crystal layer 130 (i.e. a light-emitting side of the first substrate 110). The second polarizer 150 is disposed on one side of the second substrate 120 and opposite to the liquid crystal layer 130 (i.e. a light-incident side of the second substrate 120).

Referring to FIG. 2 again, when the liquid crystal display panel 100 is the PSVA type liquid crystal display panel, the first substrate 110 can comprise a first electrode 111, a first alignment layer 112 and a first polymer alignment layer 113, and the second substrate 120 can comprise a second electrode 121, a second alignment layer 122 and a second polymer alignment layer 123. The first alignment layer 112 and the first polymer alignment layer 113 are formed on the first electrode 111 in sequence. The second alignment layer 122 and the second polymer alignment layer 123 are formed on the second electrode 121 in sequence. The first electrode 111 and the second electrode 121 are preferably made of a transparent and electrically conductive material, such as ITO, IZO, AZO, GZO, TCO or ZnO. A voltage can be applied to the liquid crystal molecules of the liquid crystal layer 130 by the first electrode 111 and the second electrode 121. In this embodiment, the first electrode 111 may be a common electrode, and the second electrode 121 may be a pixel electrode. In addition, the second electrode 121 can have a plurality of regions, and the voltage applied to each of the regions may be the same or different. The alignment layers 112, 122 and the polymer alignment layers 113, 123 can have an alignment direction for determining the orientation of the liquid crystal molecules of the liquid crystal layer 130. The alignment layers 112, 122 and the polymer alignment layers 113, 123 can have a pre-tilt angle, wherein the pre-tilt angle is less than 90 degrees, preferably less than 60 degrees. The alignment layers 112, 122 are formed on the substrates 110, 120, respectively. The polymer alignment layers 113, 123 are polymerized of the reactive monomers bonded with the alignment layers 112, 122.

Figure 3:
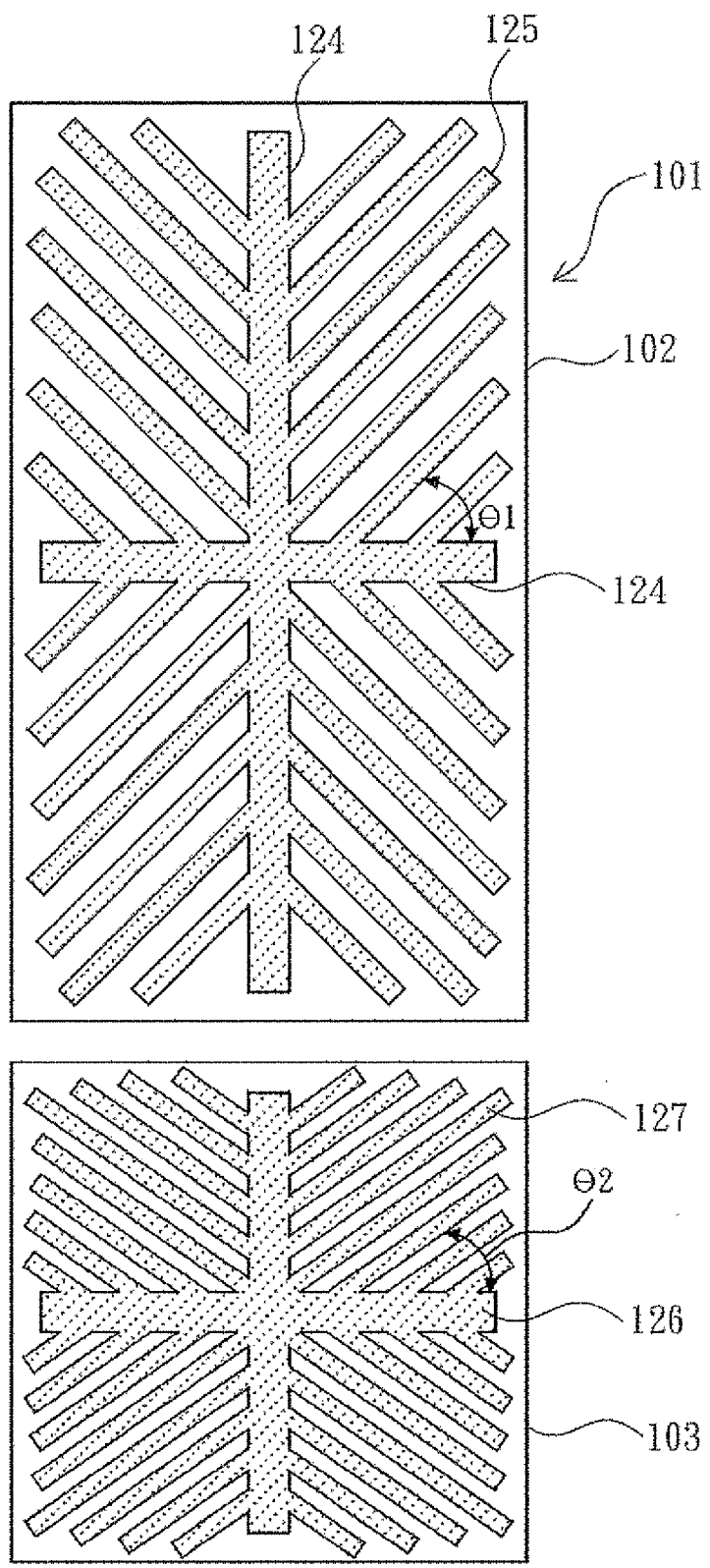
FIG. 3 is a schematic diagram showing a pixel electrode structure of the liquid crystal display panel according to one embodiment of the present invention.
Figure 4:
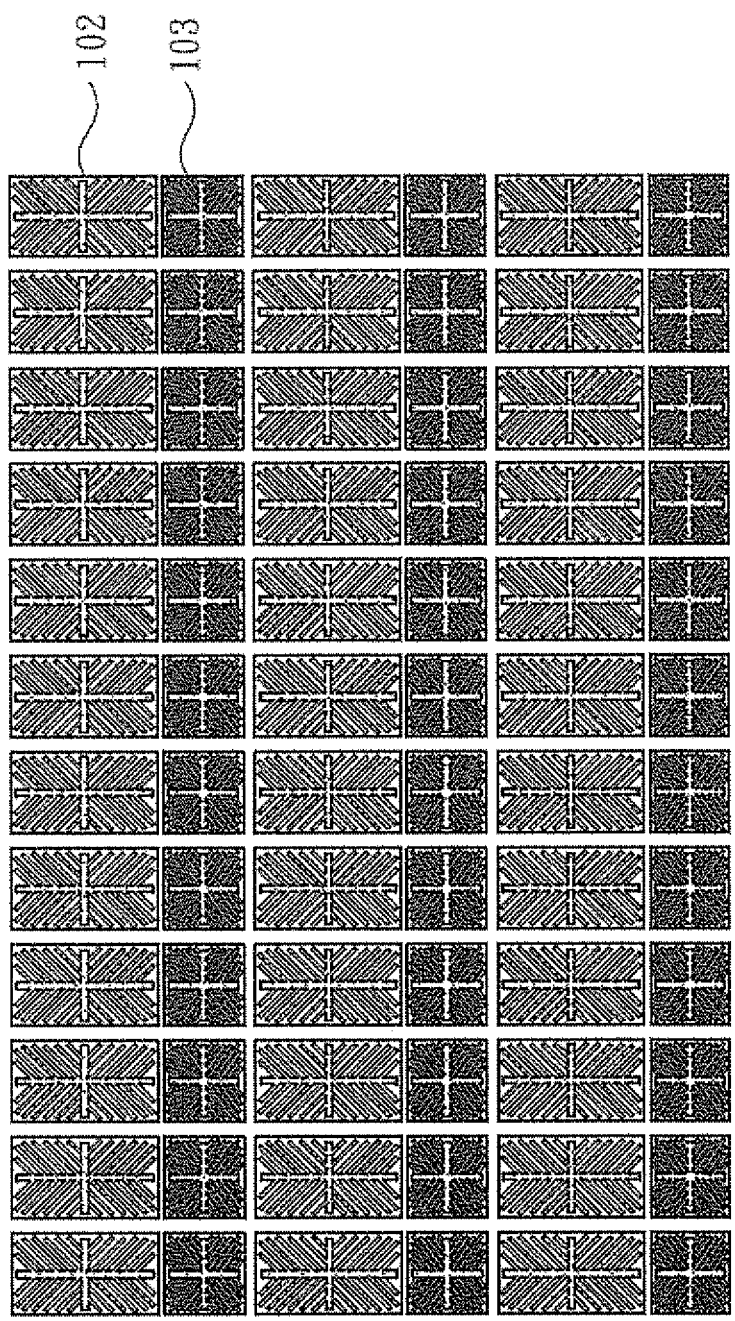
FIG. 4 is a schematic diagram showing main pixel regions and sub-pixel regions of the liquid crystal display panel according to one embodiment of the present invention.

Referring to FIG. 3 and FIG. 4, FIG. 3 is a schematic diagram showing a pixel electrode structure of the liquid crystal display panel according to one embodiment of the present invention, and FIG. 4 is a schematic diagram showing main pixel regions and sub-pixel regions of the liquid crystal display panel according to one embodiment of the present invention. The second substrate 120 comprises a plurality of signal lines (not shown), such as gate lines and data lines, which are crisscrossed, and thereby form a plurality of pixel regions 101 arranged in an array. In each of the pixel regions 101, the second electrode 121 has a main pixel region 102 and a sub-pixel region 103, wherein an area of the main pixel region 102 is preferably larger than an area of the sub-pixel region 103. A pixel electrode structure in each of the main pixel region 102 comprises a first trunk portion 124 and a plurality of first branch portions 125. A pixel electrode structure in each of the sub-pixel region 103 comprises a second trunk portion 126 and a plurality of second branch portions 127. The first trunk portion 124 and the second trunk portion 126 may be crisscross patterns, and each of the main pixel regions 102 and the sub-pixel regions 103 is divided into four pixel region units by the trunk portions 124 and 126. The branch portions 125 and 127 obliquely extend from the trunk portions 124, 126, and are arranged parallel to each other. In this case, an angle θ1 between the first trunk portion 124 and the first branch portions 125 in the main pixel regions 102 is equal to 45 degrees for enhancing the transmittance of the liquid crystal display panel 100. An angle θ2 between the second trunk portion 126 and the second branch portions 127 in the sub-pixel regions 103 is less than or greater than 45 degrees, i.e. not equal to 45 degrees (θ≠45°) for improving the color shift problem exiting in the VA type LCD apparatus.

In this case, the angle θ2 may be in the range of 10 degrees to 80 degrees except 45 degrees, for example in the range of 35 degrees to 55 degrees except 45 degrees (such as 55 or 40 degrees). Moreover, the sub-pixel regions 103 are preferably positioned at one side of the main pixel regions 102, and the main pixel regions 102 are alternately arranged with the sub-pixel regions 103 on the second substrate 120.

Figure 5:
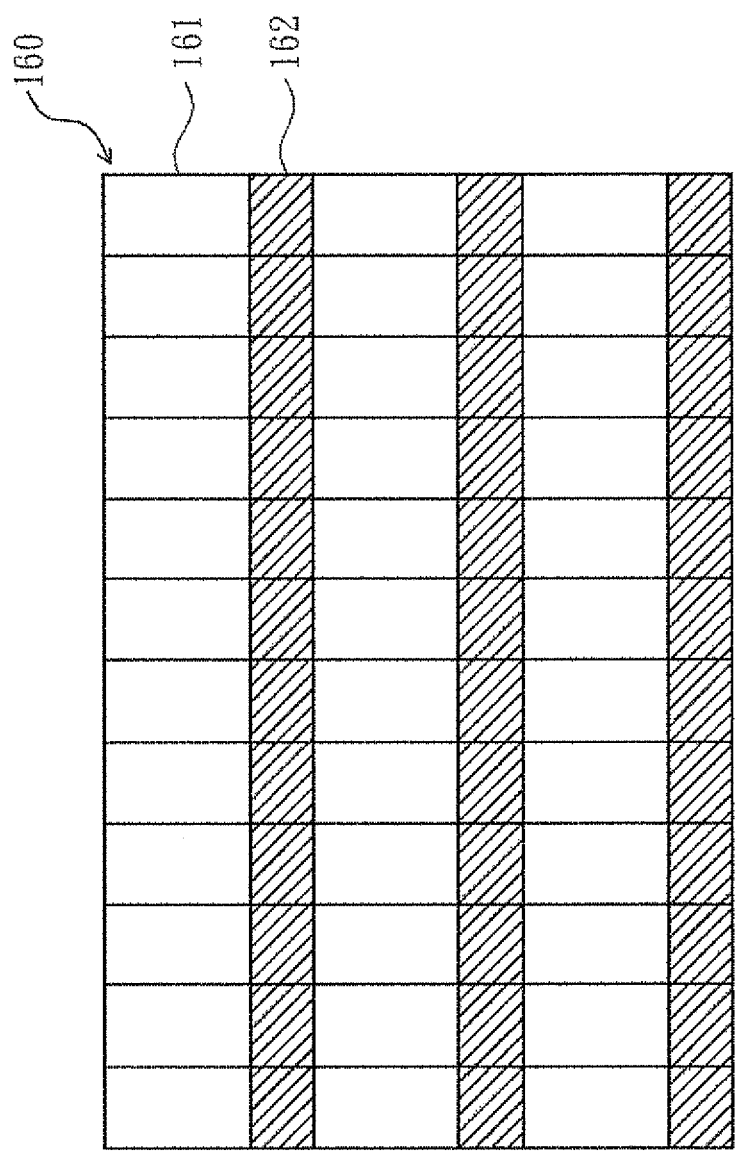
FIG. 5 is a schematic diagram showing the λ/4 pattern retarder film of the liquid crystal display panel according to one embodiment of the present invention.
Figure 6:
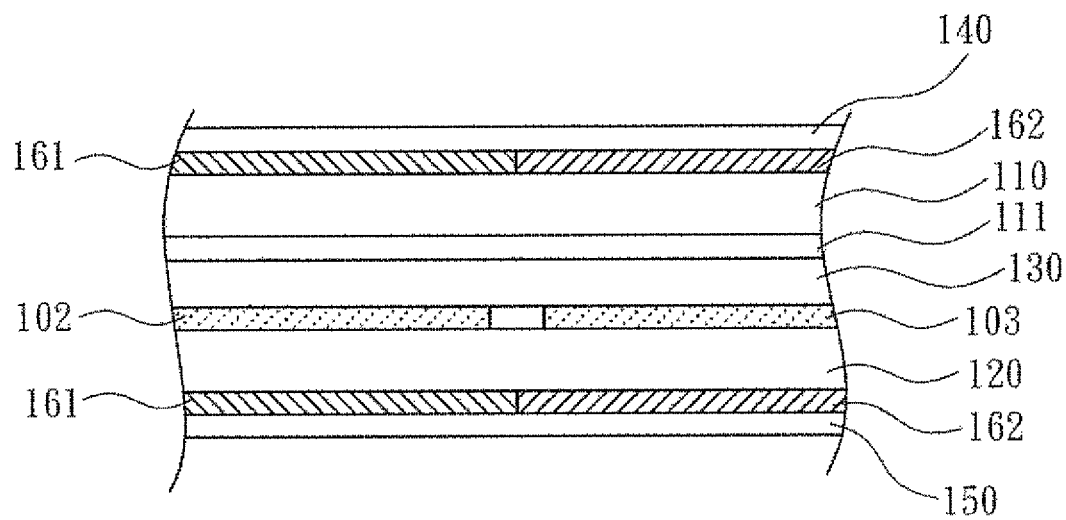
FIG. 6 is a cross-sectional view showing a liquid crystal display panel according to one embodiment of the present invention.

Referring to FIG. 5 and FIG. 6, FIG. 5 is a schematic diagram showing the λ/4 pattern retarder film of the liquid crystal display panel according to one embodiment of the present invention, and FIG. 6 is a cross-sectional view showing a liquid crystal display panel according to one embodiment of the present invention. Each of the λ/4 pattern retarder films 160 comprises a plurality of zero wave retarder rows 161 and a plurality of λ/4 retarder rows 162. The zero wave retarder rows 161 and the λ/4 retarder rows 162 are arranged in an alternating manner. The zero wave retarder rows 161 are positioned to the main pixel regions 102, and the λ/4 retarder rows 162 are positioned to the sub-pixel regions. In this case, a width of the zero wave retarder rows 161 is about the same or similar to a width of the main pixel regions 102, and a width of the λ/4 retarder rows 162 is about the same or similar to a width of the sub-pixel regions 103. Therefore, the light rays passing through the main pixel regions 102 can correspondingly pass through the zero wave retarder rows 161, and the light rays passing through the sub-pixel regions 103 can correspondingly pass through the λ/4 retarder rows 162.

According to an optical theory, when an angle between a tilting direction of the liquid crystal molecules and an absorption axis of the polarizer is 45 degrees, the liquid crystal display panel can have a greatest transmittance. Therefore, in embodiments of the present invention, the transmittance of the liquid crystal display panel 100 can be enhanced by adjusting the polarized direction and angles of the light rays.

In the main pixel regions 102, the light rays pass through the zero wave retarder rows 161 of the λ/4 pattern retarder films 160, and thus the polarized state of the light rays are not affected by the λ/4 pattern retarder films 160.

Figure 7:
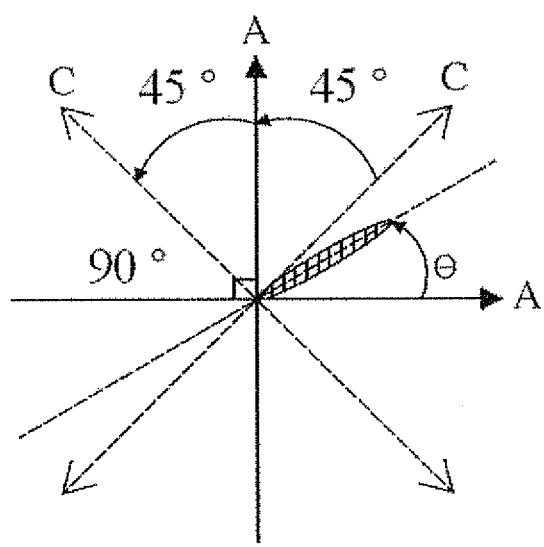
FIG. 7 is a schematic diagram showing different angles according to one embodiment of the present invention.

Referring to FIG. 7, a schematic diagram showing different angles according to one embodiment of the present invention is illustrated. In the sub-pixel regions 103, the absorption axis of the first polarizer 140 may be vertical to the absorption axis of the second polarizer 150. That is, an angle between the absorption axes A of the first polarizer 140 and the second polarizer 150 is 90 degrees. In this case, an angle between slow axes C of the λ/4 retarder rows 162 of the two λ/4 pattern retarder films 160 is 90 degrees, and an angle between the axis C of the λ/4 retarder rows 162 and the absorption axis A of the polarizer 140 or 150 is 45 degrees.

Figure 8:
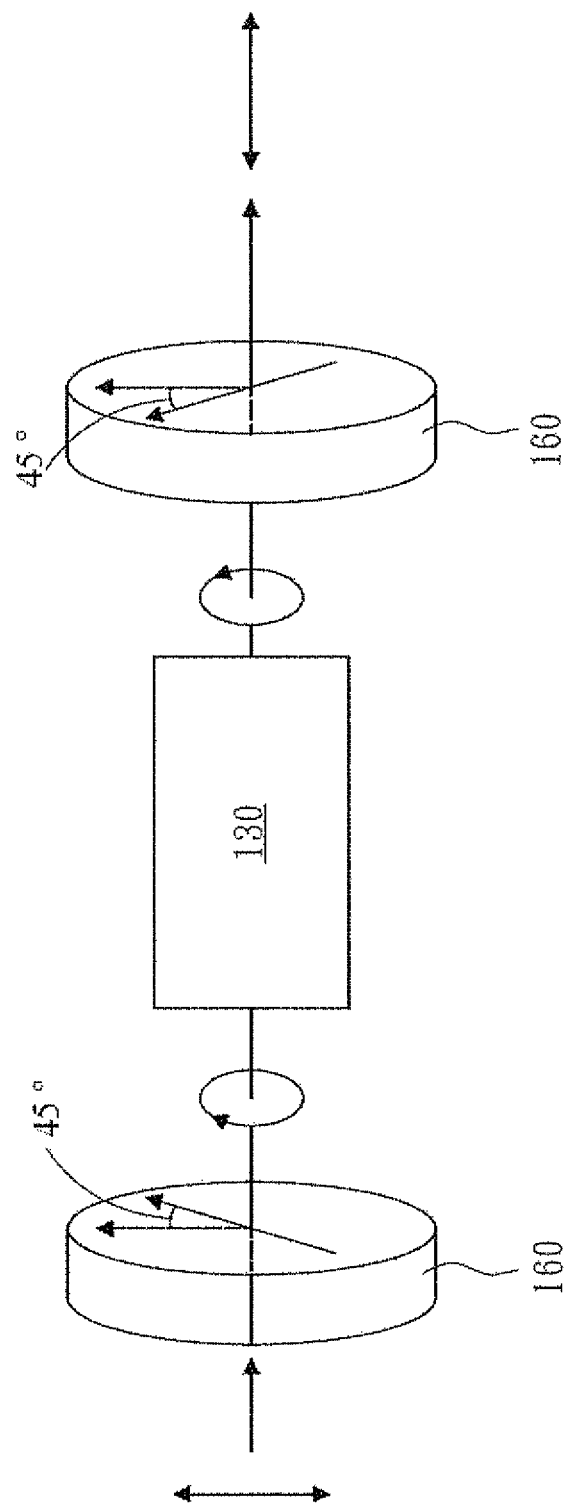
FIG. 8 is a schematic diagram showing polarized light rays according to one embodiment of the present invention.

Referring to FIG. 8, a schematic diagram showing polarized light rays according to one embodiment of the present invention is illustrated. In the sub-pixel regions 103, when the light rays are emitted from the second polarizer 150 to the first polarizer 140 of the liquid crystal display panel 100, the linearly polarized light rays from the second polarizer 150 are transformed into left handed circularly polarized light rays or right handed circularly polarized light rays by the λ/4 retarder rows 162. Subsequently, the circularly polarized light rays are transformed into another kind of circularly polarized light rays by the liquid crystal layer 130 (i.e. a liquid crystal cell). At this time, the liquid crystal layer 130 can be equivalent to a λ/2 retarder film. Subsequently, the circularly polarized light rays can be transformed into linearly polarized light rays by the λ/4 retarder rows 1620, so as to allow the light rays to pass a transmission axis of the first polarizer 140. Therefore, in the liquid crystal display panel 100, the color shift problem can be improved by the sub-pixel regions 103 with the angle θ2 (θ2≠45°), and the polarized direction and angles of the light rays can be adjusted by the λ/4 retarder rows 162 of the λ/4 pattern retarder films 160 for enhancing the transmittance of the sub-pixel regions 103.

Figure 9:
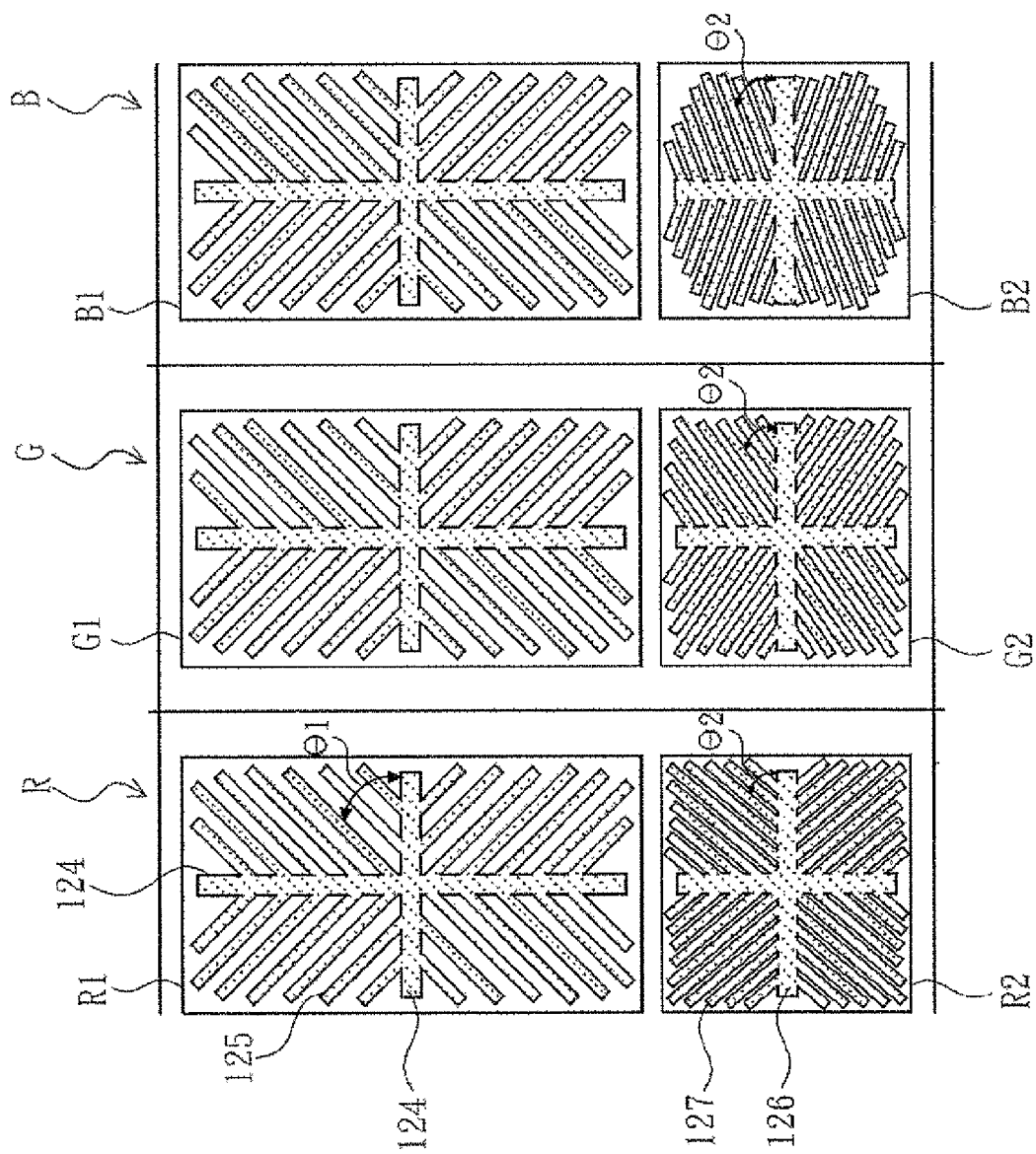
FIG. 9 is a schematic diagram showing pixel regions of a liquid crystal display panel according to another embodiment of the present invention.

Referring to FIG. 9, a schematic diagram showing pixel regions of a liquid crystal display panel according to another embodiment of the present invention is illustrated. In another embodiment, the pixel regions of the second substrate 120 comprise a plurality of pixel regions R, G, B corresponding to different color filters. For example, the pixel region R has a main pixel region R1 and a sub-pixel region R2, and the pixel region G has a main pixel region G1 and a sub-pixel region G2, and the pixel region 13 has a main pixel region B1 and a sub-pixel region B2. At this time, the angles θ1 between the first trunk portion 124 and the first branch portions 125 in the main pixel regions R1, G1, B1 of the pixel regions R, G, B are the same and about equal to 45 degrees, and the angles θ2 between the second trunk portion 126 and the second branch portions 127 in the sub-pixel regions R2, G2, B2 can be different to each other, so as to further improve the color shift problem. For example, the angle θ2 in the sub-pixel region R2 may be of 46 degrees, and the angle θ2 in the sub-pixel region G2 may be of 47 degrees, and the angle θ2 in the sub-pixel region B2 may be of 48 degrees. In this case, the λ/4 retarder rows 162 of the λ/4 pattern retarder films 160 can be positioned to the sub-pixel regions R2, G2, B2 for enhancing the transmittance thereof.

In a further embodiment, the liquid crystal display panel may be, for example, a PVA type liquid crystal display panel. At this time, the polymer alignment layers may be omitted in the liquid crystal display panel.

As described above, in the LCD panel and the display apparatus of the present invention using the same, with the use of the pixel electrode structure, the color shift problem of the VA type LCD apparatus can be improved. Moreover, the polarized direction and angles of the light rays can be adjusted by the λ/4 pattern retarder films for enhancing the transmittance of the liquid crystal display panel. Therefore, in the LCD panel and the display apparatus of the present invention using the same, the color shift problem of the LCD panel can be improved, and the transmittance thereof can be enhanced.

The present invention has been described with a preferred embodiment thereof and it is understood that many changes and modifications to the described embodiment can be carried out without departing from the scope and the spirit of the invention that is intended to be limited only by the appended claims.

The invention claimed is:

1. A liquid crystal display panel comprising:
a first substrate comprising a first electrode;
a second substrate comprising a second electrode, wherein the second electrode has a plurality of main pixel regions and a plurality of sub-pixel regions, and each of the main pixel regions comprises a first trunk portion and plurality of first branch portions, and an angle between the first trunk portion and the first branch portions is equal to 45 degrees, and each of the sub-pixel regions comprises a second trunk portion and plurality of second branch portions, and an angle between the second trunk portion and the second branch portions is in the range of 10 degrees to 80 degrees except 45 degrees;
a liquid crystal layer formed between the first substrate and the second substrate;
a first polarizer disposed at an outer side of the first substrate;
a second polarizer disposed at an outer side of the second substrate; and
two quarter wave pattern retarder films disposed between the first substrate and the first polarizer, and between the second substrate and the second polarizer, respectively, wherein the quarter wave pattern retarder films comprise a plurality of quarter wave retarder rows and a plurality of zero wave retarder rows, and the zero wave retarder rows are positioned to the main pixel regions, and the quarter wave retarder rows are positioned to the sub-pixel regions, and an angle between the absorption axes of the first polarizer and the second polarizer is 90 degrees, and an angle between a slow axis of the quarter wave retarder rows and an absorption axis of the first polarizer or the second polarizer is 45 degrees.

2. The liquid crystal display panel according to claim 1, wherein the angle between the second trunk portion and the second branch portions is in the range of 35 degrees to 55 degrees except 45 degrees.

3. The liquid crystal display panel according to claim 1, wherein a width of the zero wave retarder rows is the same to a width of the main pixel regions, and a width of the quarter wave retarder rows is the same to a width of the sub-pixel regions.

4. The liquid crystal display panel according to claim 1, wherein angles between the second trunk portion and the second branch portions in the sub-pixel regions are different to each other.

5. The liquid crystal display panel according to claim 1, wherein an area of the main pixel region is larger than an area of the sub-pixel region.

6. A liquid crystal display panel comprising:
a first substrate comprising a first electrode;
a second substrate comprising a second electrode, wherein the second electrode has a plurality of main pixel regions and a plurality of sub-pixel regions, and each of the main pixel regions comprises a first trunk portion and plurality of first branch portions, and an angle between the first trunk portion and the first branch portions is equal to 45 degrees, and each of the sub-pixel regions comprises a second trunk portion and plurality of second branch portions, and an angle between the second trunk portion and the second branch portions is less than or greater than 45 degrees;
a liquid crystal layer formed between the first substrate and the second substrate;
a first polarizer disposed at an outer side of the first substrate;
a second polarizer disposed at an outer side of the second substrate; and
two quarter wave pattern retarder films disposed between the first substrate and the first polarizer, and between the second substrate and the second polarizer, respectively, wherein the quarter wave pattern retarder films comprise a plurality of quarter wave retarder rows and a plurality of zero wave retarder rows, and the zero wave retarder rows are positioned to the main pixel regions, and the quarter wave retarder rows are positioned to the sub-pixel regions.

7. The liquid crystal display panel according to claim 6, wherein the angle between the second trunk portion and the second branch portions is in the range of 10 degrees to 80 degrees except 45 degrees.

8. The liquid crystal display panel according to claim 7, wherein the angle between the second trunk portion and the second branch portions is in the range of 35 degrees to 55 degrees except 45 degrees.

9. The liquid crystal display panel according to claim 6, wherein a width of the zero wave retarder rows is the same to a width of the main pixel regions, and a width of the quarter wave retarder rows is the same to a width of the sub-pixel regions.

10. The liquid crystal display panel according to claim 6, wherein an angle between the absorption axes of the first polarizer and the second polarizer is 90 degrees, and an angle between a slow axis of the quarter wave retarder rows and an absorption axis of the first polarizer or the second polarizer is 45 degrees.

11. The liquid crystal display panel according to claim 6, wherein angles between the second trunk portion and the second branch portions in the sub-pixel regions are different to each other.

12. The liquid crystal display panel according to claim 6, wherein an area of the main pixel region is larger than an area of the sub-pixel region.

13. A display apparatus comprising:
a backlight module; and
a liquid crystal display panel comprising:
   a first substrate comprising a first electrode;
   a second substrate comprising a second electrode, wherein the second electrode has a plurality of main pixel regions and a plurality of sub-pixel regions, and each of the main pixel regions comprises a first trunk portion and plurality of first branch portions, and an angle between the first trunk portion and the first branch portions is equal to 45 degrees, and each of the sub-pixel regions comprises a second trunk portion and plurality of second branch portions, and an angle between the second trunk portion and the second branch portions is less than or greater than 45 degrees;
   a liquid crystal layer formed between the first substrate and the second substrate;
   a first polarizer disposed at an outer side of the first substrate;
   a second polarizer disposed at an outer side of the second substrate; and
   two quarter wave pattern retarder films disposed between the first substrate and the first polarizer, and between the second substrate and the second polarizer, respectively, wherein the quarter wave pattern retarder films comprise a plurality of quarter wave retarder rows and a plurality of zero wave retarder rows, and the zero wave retarder rows are positioned to the main pixel regions, and the quarter wave retarder rows are positioned to the sub-pixel regions.

14. The display apparatus according to claim 13, wherein the angle between the second trunk portion and the second branch portions is in the range of 10 degrees to 80 degrees except 45 degrees.

15. The display apparatus according to claim 14, wherein the angle between the second trunk portion and the second branch portions is in the range of 35 degrees to 55 degrees except 45 degrees.

16. The display apparatus according to claim 13 wherein a width of the zero wave retarder rows is the same to a width of the main pixel regions, and a width of the quarter wave retarder rows is the same to a width of the sub-pixel regions.

17. The display apparatus according to claim 13, wherein an angle between the absorption axes of the first polarizer and the second polarizer is 90 degrees, and an angle between a slow axis of the quarter wave retarder rows and an absorption axis of the first polarizer or the second polarizer is 45 degrees 18. The display apparatus according to claim 13, wherein angles between the second trunk portion and the second branch portions in the sub-pixel regions are different to each other.

19. The display apparatus according to claim 13, wherein an area of the main pixel region is larger than an area of the sub-pixel region.

* * * * *